United States Patent
Müller et al.

[11] Patent Number: 5,976,722
[45] Date of Patent: Nov. 2, 1999

[54] PROCESS FOR OPERATING A FUEL CELL INSTALLATION AND FUEL CELL INSTALLATION FOR CARRYING OUT THE PROCESS

[75] Inventors: Reinhard Müller, Erlangen; Walter Stühler, Hirschaid; Christoph Nölscher, Nürnberg, all of Germany

[73] Assignee: Siemens Aktiengesellschatf, Munich, Germany

[21] Appl. No.: 09/038,652

[22] Filed: Mar. 11, 1998

Related U.S. Application Data

[63] Continuation of application No. PCT/DE96/01635, Sep. 3, 1996.

[30] Foreign Application Priority Data

Sep. 11, 1995 [DE] Germany .......................... 195 33 603

[51] Int. Cl.$^6$ ...................................................... H01M 8/04
[52] U.S. Cl. .................................. 429/13; 429/17; 429/26
[58] Field of Search ................................. 429/12, 13, 17, 429/20, 24, 26, 19

[56] References Cited

U.S. PATENT DOCUMENTS 5,360,679  11/1994  Buswell et al. .

FOREIGN PATENT DOCUMENTS

| 2040000 | 1/1971 | France . |
| 2349221 | 11/1977 | France . |
| 4201632A1 | 7/1993 | Germany . |
| 4318818C2 | 5/1995 | Germany . |

*Primary Examiner*—Maria Nuzzolillo
*Assistant Examiner*—Susy Tsang
*Attorney, Agent, or Firm*—Herbert L. Lerner; Laurence A. Greenberg

[57] ABSTRACT

A process for operating a fuel cell installation and a fuel cell installation for carrying out the process include at least one fuel cell block. A process gas for the fuel cell block is fed into the fuel cell block with a liquid ring compressor. In this way, the process gas is humidified at the same time as it is compressed, thus using the compression heat simultaneously as evaporation enthalpy, as well as the heat from the cooling circuit of the fuel cell stack.

10 Claims, 3 Drawing Sheets

PROCESS FOR OPERATING A FUEL CELL INSTALLATION AND FUEL CELL INSTALLATION FOR CARRYING OUT THE PROCESS

CROSS-REFERENCE TO RELATED APPLICATION

This application is a continuation of International Application Serial No. PCT/DE96/01635, filed Sep. 3, 1996, which designated the United States.

BACKGROUND OF THE INVENTION

Field of the Invention

The invention relates to a process for operating a fuel cell installation and to a fuel cell installation for carrying out the process.

It is known that, during the electrolysis of water, the water molecules are decomposed by electric current into hydrogen and oxygen. In fuel cells, that process takes place in reverse. During the electrochemical combination of hydrogen and oxygen to form water, electric current is produced with high efficiency, and when pure hydrogen is used as a process gas, it is produced without the emission of pollutants and carbon dioxide. Even with technical process gases, for example natural gas or coal gas, and with air, or air enriched with $O_2$ instead of pure oxygen, a fuel cell produces considerably less pollutants and less $CO_2$ than other forms of energy production which operate by using fossil energy sources. The technical implementation of the fuel cell principle has given rise to a wide variety of solutions, and more precisely with different electrolytes and with operating temperatures of between 1000° C. and 800° C. Fuel cells are divided, depending on their operating temperature, into low, medium and high temperature fuel cells, which in turn differ through various technical embodiments.

A fuel cell block, which is also referred to as a "stack" in the specialist literature, is generally composed of a multiplicity of fuel cells stacked on one another.

A problem which arises in this case is that of humidifying and compressing the process gases before they enter the fuel cell block, since the enthalpy of vaporization needs to be provided for the humidification. Devices with membrane humidification or water injection after compression are known from the literature, for example from German Patent DE 43 18 818 C2. One aspect which cannot be ignored is, moreover, the overall size of the membrane humidifier, which is of the same order as that of the fuel cell block, and leads to an additional requirement for space. Both solutions are found to be cost-intensive.

Further, German Published, Non-Prosecuted Patent Application DE 42 01 632 A1 discloses a process for humidifying at least one reactant flowing to an acidic or alkaline fuel cell. That reactant is only separated from the same reactant flowing out of the fuel cell by a semipermeable membrane.

In addition, Published French Patent Application 2 349 221 describes a fuel cell installation in which two liquid ring pumps feed the gases into the fuel cells. The off-gases of the fuel cells are fed back in a circuit and separated from entrained potassium carbonate electrolyte as a result of the latter being transferred into the liquid ring by centrifugal force in the liquid ring pump.

SUMMARY OF THE INVENTION

It is accordingly an object of the invention to provide a process for operating a fuel cell installation and a fuel cell installation for carrying out the process, which overcome the hereinafore-mentioned disadvantages of the heretofore-known processes and devices of this general type and in which a pressure drop for humidifying and compressing process gases in a humidifier is avoided, overall size is reduced and additional costs are saved.

With the foregoing and other objects in view there is provided, in accordance with the invention, a process for operating a fuel cell installation, which comprises feeding a process gas for at least one fuel cell block into the at least one fuel cell block with a liquid ring compressor; cooling the at least one fuel cell block with cooling water from a cooling water container; and operating the liquid ring compressor with the cooling water from the at least one fuel cell block.

The required process gas is humifidied at the same time as it is compressed by virtue of the use of the liquid ring compressor. The degree of humidification is set by the temperature and the throughput of the cooling water fed to the liquid ring compressor. This process can be used for process gases both on the anode side and on the cathode side. The membrane humidifier known from the prior art can therefore be omitted, by virtue of which the pressure drop in the humidifier is at the same time avoided and the compressor power needed for operation of the fuel cell block is thereby reduced. The overall size of the fuel cell installation is consequently also decreased. This does away with an equipment component having a size which is on the order of that of the fuel cell block. The costs for the installation as a whole are therefore also reduced. Since the cooling water is taken from the fuel cell block, the process gas is advantageously humidified at the temperature of the fuel cell block.

In accordance with another mode of the invention, a part of the process gas is directed in a bypass around the liquid ring compressor in order to control the throughput of the process gas through the liquid ring compressor. This bypass control method obviates the need for an additional speed control for the liquid ring compressor. This affords the advantage of a very dynamic system, since the motor of the liquid ring compressor runs continuously, which at the same time turns out to be an additional cost saving for the liquid ring compressor.

In accordance with a further mode of the invention, the process gas is heated in a heat exchanger connected upstream of the liquid ring compressor. If operation of the fuel cell installation requires a larger throughput of the process gas, then the cooling water flowing through the liquid ring compressor is not alone enough to heat the process gas and to provide the enthalpy of vaporization for the humidification. Additional external heating is needed, that is to say heating of the process gas outside the liquid ring compressor. The throughput of coolant through the liquid ring compressor in this case is insufficient on its own.

In accordance with an added mode of the invention, the process gas is heated by the cooling water from the fuel cell block. In this case, the heat of the cooling water is transferred in the heat exchanger to the process gas for the fuel cell block.

In accordance with an additional feature of the invention, a process off-gas from the fuel cell block is fed to the process gas to humidify it and heat it. This reduces the quantity of process gas which is required.

With the objects of the invention in view, there is also provided a fuel cell installation, comprising at least one fuel cell block; a liquid ring compressor for feeding a process gas for the at least one fuel cell block into the at least one fuel cell block; and a cooling water container disposed between the liquid ring compressor and the at least one fuel cell block, for cooling the at least one fuel cell block with cooling water from the cooling water container and operating the liquid ring compressor with the cooling water from the at least one fuel cell block.

In accordance with another feature of the invention, there is provided a bypass for controlling the throughput of the process gas through the liquid ring compressor.

In accordance with a further feature of the invention, there is provided a valve for controlling the throughput of the process gas through the bypass.

In accordance with an added feature of the invention, there is provided a heat exchanger connected upstream of the liquid ring compressor for heating the process gas.

In accordance with a concomitant feature of the invention, there is provided a feedback system for process off-gas, with which the process off-gas from the fuel cell block is fed to the process gas.

Other features which are considered as characteristic for the invention are set forth in the appended claims.

Although the invention is illustrated and described herein as embodied in a process for operating a fuel cell installation and a fuel cell installation for carrying out the process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
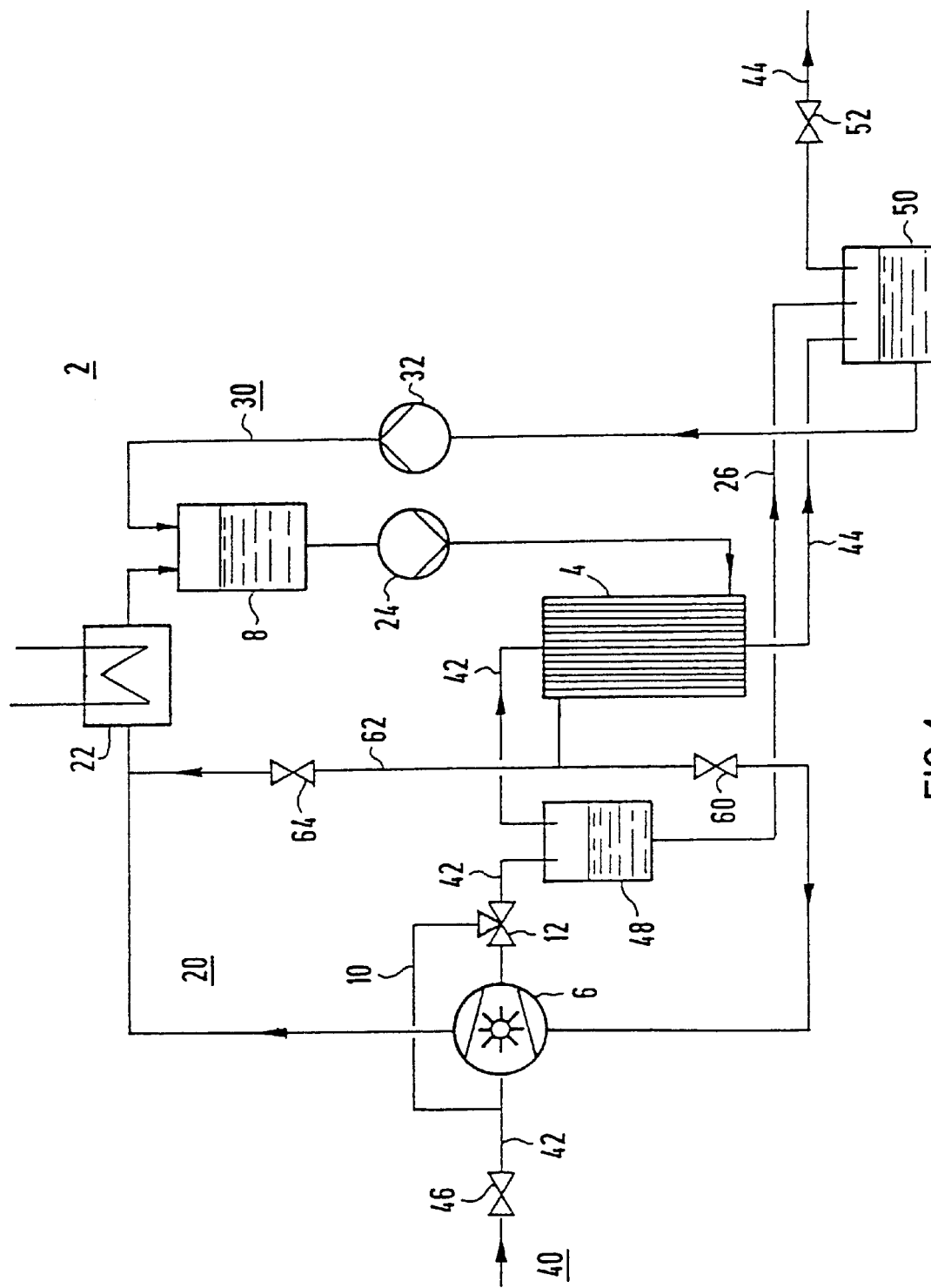
FIGS. 1 to 3 are schematic representations of fuel cell installations.

Referring now to the figures of the drawings in detail and first, particularly, to FIG. 1 thereof, there is seen a fuel cell installation 2 which includes a fuel cell block 4, a cooling water circuit 20, a product water feedback 30 and a process gas supply 40. The process gas supply 40 is composed of a feed 42 for process gas for the fuel cell block 4 and a discharge 44 for process gas from the fuel cell block 4.

A valve 46, a liquid ring compressor 6, a valve 12 and a water separator 48 are disposed in the feed 42 in that order according to a flow direction. The liquid ring compressor 6 is supplied with cooling water from the cooling water circuit 20. The process gas is humidified at the same time as it is compressed by virtue of the use of the liquid ring compressor 6. The degree of humidification is set by the temperature of the cooling water fed to the liquid ring compressor 6 and by the throughput of that water. This process can be used for process gases both on the anode side and on the cathode side of the fuel cell block 4.

A bypass 10 which is disposed between the valve 46 and the liquid ring compressor 6, branches off from the feed 42 and discharges between the liquid ring compressor 6 and the water separator 48, into the valve 12 which is also disposed in the feed 42. This bypass control obviates the need for an additional speed control for the liquid ring compressor 6. This affords the advantage of a very dynamic system, since the motor of the liquid ring compressor 6 runs continuously and the fuel cell block 4 nevertheless receives the corresponding throughput of the process gas, according to the relevant electric current.

A product water container 50 in which the product water from the fuel cell block 4 is collected and a valve 52, are disposed in the discharge 44 for process off-gas or waste gas from the fuel cell block 4, in that order according to the flow direction.

A valve 60, the liquid ring compressor 6, a cooler 22, a cooling water container 8 and a cooling water pump 24 are disposed in the cooling water circuit 20, which branches off from the fuel cell block 4 and delivers back into it, in that order according to the flow direction, starting from the fuel cell block 4. The cooling water pump 24 is therefore the last item of equipment before the cooling water circuit 20 closes and discharges back into the fuel cell block 4.

The cooling water discharged from the fuel cell block 4 heats the process gas for the fuel cell block 4 in the liquid ring compressor 6 and provides the enthalpy of vaporization needed to humidify the process gas.

A line 62 which is disposed between the fuel cell block 4 and the valve 60 branches off from the cooling water circuit 20 to discharge back into it, between the liquid ring compressor 6 and the cooler 22. A valve 64 for controlling the amount of cooling water which flows directly from the fuel cell block 4 into the cooler 22, is connected into the line 62. The amount of cooling water for the liquid ring compressor 6 is controlled through the use of the valve 60.

The product water feedback 30 branches off from the product water container 50 and discharges into the cooling water container 8. A product water pump 32 is disposed in the product water feedback 30.

A line 26 branches off from the water separator 48 and discharges into the product water container 50. Excess water in the water separator 48 is therefore fed through the line 26 and the product water feedback 30, back into the cooling water circuit 20.

Figure 2:
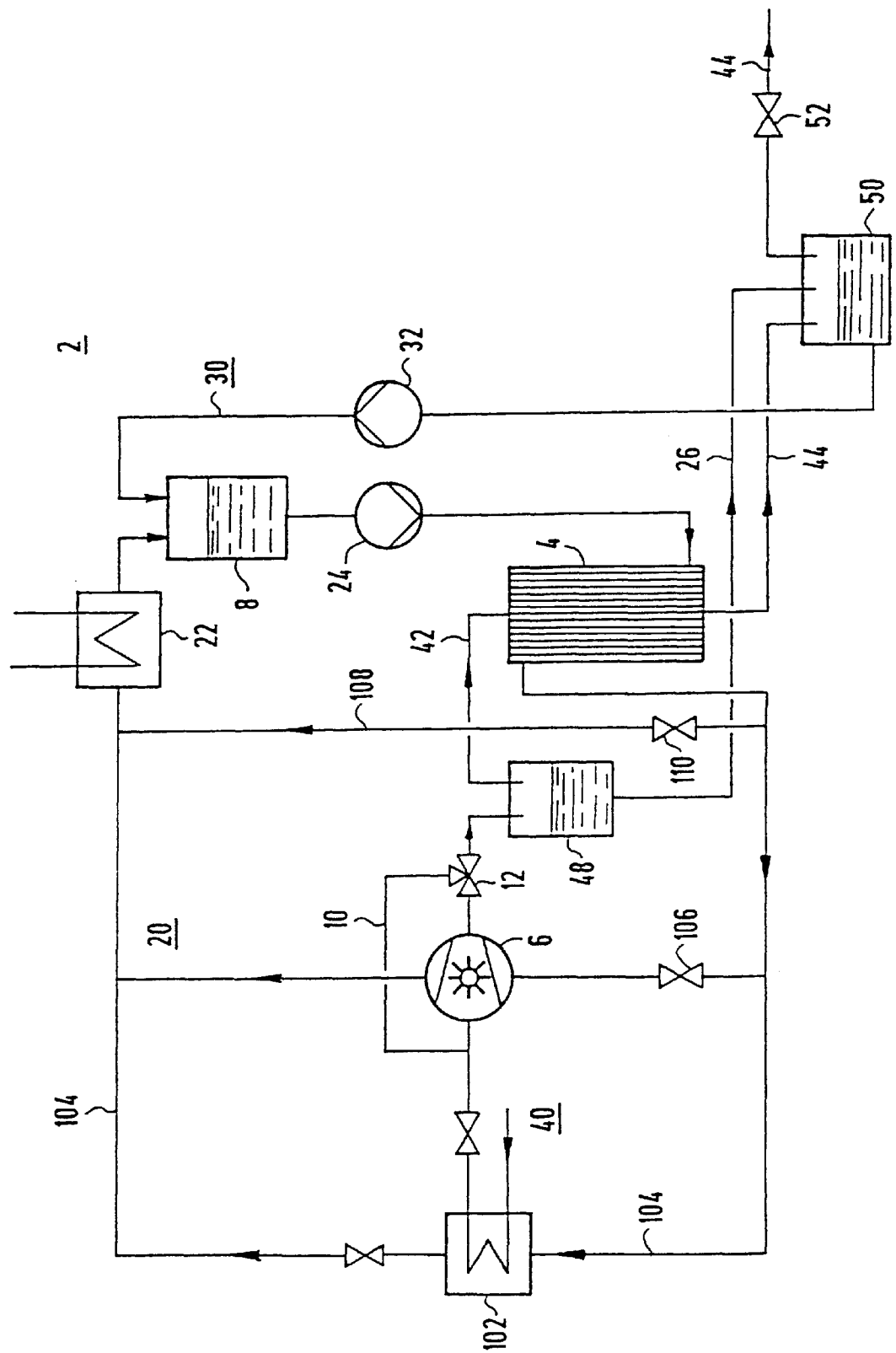

In the embodiment according to FIG. 2, a heat exchanger 102 is connected upstream of the valve 46 in the feed 42 for the process gas.

Further, a line 104 branches off from the cooling water circuit 20 between the fuel cell block 4 and the liquid ring compressor 6. The cooling water in the line 104 flows through the heat exchanger 102 and is delivered back into the cooling water circuit 20 between the liquid ring compressor 6 and the cooler 22. If operation of the fuel cell installation 2 requires a larger throughput of the process gas for the fuel cell block 4, then the cooling water is insufficient to heat the process gas and provide the enthalpy of vaporization for the humidification. Additional external heating is then required, that is to say heating of the process gas outside the liquid ring compressor 6. In this case, the process gas for the fuel cell block 4 is additionally preheated in the heat exchanger 102.

In order to control the throughput of cooling water through the liquid ring compressor 6, a valve 106 is additionally disposed in the cooling water circuit 20, between a location where the line 104 branches off from the cooling water circuit 20 and the liquid ring compressor 6.

Further, a line 108 branches off from the cooling water circuit 20 between the fuel cell block 4 and a location where the line 104 branches off from the cooling water circuit 20, and delivers back into the cooling water circuit 20 between a location where the line 104 delivers into the cooling water circuit 20 and the cooler 22. A valve 110 is disposed in the line 108 for controlling the amount of cooling water from the fuel cell block 4 which is fed directly into the cooler 22.

Figure 3:
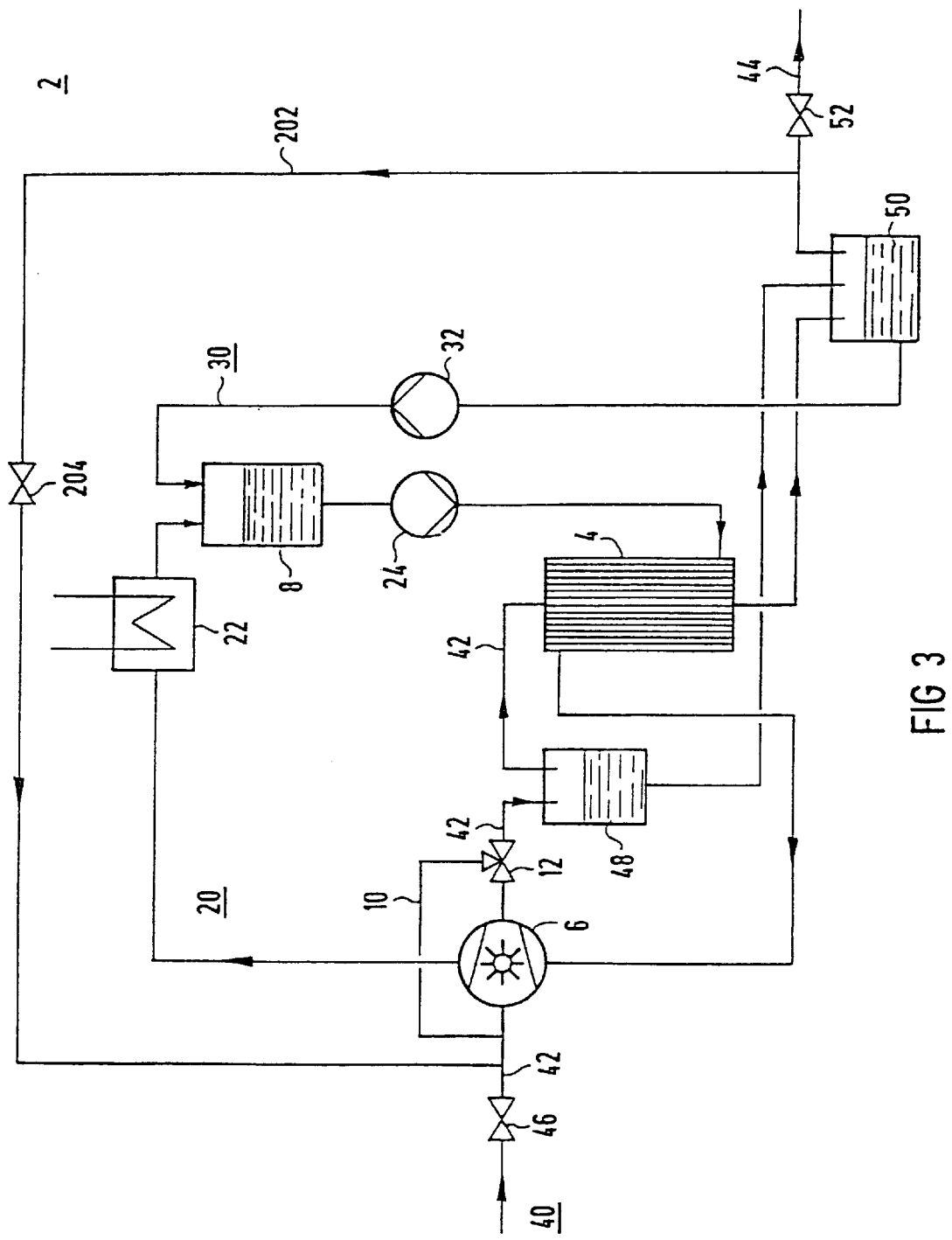

In the third embodiment according to FIG. 3, a process off-gas or waste gas from the fuel cell block 4 is fed to the process gas for the fuel cell block 4 in order to humidify and heat it. For this purpose, a process off-gas feedback 202 branches off from the discharge 44 between the product water container 50 and the valve 52, before discharging into the feed 42 between the valve 46 and a location where the bypass 10 branches off.

A valve 204 is disposed in the process off-gas feedback 202 for controlling the throughput of the process off-gas which is fed back.

The process off-gas from the fuel cell block 4 gives up its product water content to the product water container 50 before it reaches the process off-gas feedback 202. Consequently, after it has flowed through the process off-gas feedback 202, the process off-gas from the fuel cell block 4 is reused as process gas for the fuel cell block 4. In this way, the volume of process gas which is required is reduced and additional costs are saved.

We claim:

1. A process for operating a fuel cell installation, which comprises:

feeding a process gas for at least one fuel cell block into the at least one fuel cell block with a liquid ring compressor;

cooling the at least one fuel cell block with cooling water from a cooling water container; and operating the liquid ring compressor with the cooling water from the at least one fuel cell block.

2. The process according to claim 1, which comprises directing a part of the process gas in a bypass around the liquid ring compressor, for controlling a throughput of the process gas through the liquid ring compressor.

3. The process according to claim 1, which comprises heating the process gas in a heat exchanger connected upstream of the liquid ring compressor.

4. The process according to claim 1, which comprises heating the process gas with the cooling water from the fuel cell block.

5. The process according to claim 1, which comprises feeding a process off-gas from the fuel cell block to the process gas to heat it.

6. A fuel cell installation, comprising:

at least one fuel cell block;

a liquid ring compressor for feeding a process gas for said at least one fuel cell block into said at least one fuel cell block; and a cooling water container disposed between said liquid ring compressor and said at least one fuel cell block, for cooling said at least one fuel cell block with cooling water from said cooling water container and operating said liquid ring compressor with the cooling water from said at least one fuel cell block.

7. The fuel cell installation according to claim 6, including a bypass for controlling a throughput of the process gas through said liquid ring compressor.

8. The fuel cell installation according to claim 7, including a valve for controlling the throughput of the process gas through said bypass.

9. The fuel cell installation according to claim 6, including a heat exchanger connected upstream of said liquid ring compressor for heating the process gas.

10. The fuel cell installation according to claim 6, including a process off-gas feedback system, for feeding a process off-gas from said at least one fuel cell block to the process gas.

* * * * *